United States Patent
Seegebarth

(10) Patent No.: US 10,771,256 B2
(45) Date of Patent: Sep. 8, 2020

(54) METHOD FOR GENERATING AN ELECTRONIC SIGNATURE

(71) Applicant: Bundesdruckerei GMBH, Berlin (DE)

(72) Inventor: Christian Seegebarth, Hamburg (DE)

(73) Assignee: BUNDESDRUCKEREI GMBH, Berlin (DE)

(*) Notice: Subject to any disclaimer, the term of this patent is extended or adjusted under 35 U.S.C. 154(b) by 349 days.

(21) Appl. No.: 15/568,693

(22) PCT Filed: Apr. 25, 2016

(86) PCT No.: PCT/EP2016/059199
§ 371 (c)(1),
(2) Date: Oct. 23, 2017

(87) PCT Pub. No.: WO2016/173993
PCT Pub. Date: Nov. 3, 2016

(65) Prior Publication Data
US 2018/0302227 A1    Oct. 18, 2018

(30) Foreign Application Priority Data
Apr. 30, 2015 (DE) .................. 10 2015 208 088

(51) Int. Cl.
*H04L 9/00* (2006.01)
*H04L 9/32* (2006.01)
(Continued)

(52) U.S. Cl.
CPC ............ *H04L 9/3247* (2013.01); *G06F 21/43* (2013.01); *G06F 21/645* (2013.01);
(Continued)

(58) Field of Classification Search
CPC .................................................. H04L 9/3247
(Continued)

(56) References Cited

U.S. PATENT DOCUMENTS 8,006,300 B2* 8/2011 Mizrah .................. G06F 21/36
726/18
8,078,879 B2* 12/2011 Landrock ............. G06F 21/645
713/176
(Continued)

FOREIGN PATENT DOCUMENTS

DE 102010028133 A1 10/2011
EP 1455503 A2 9/2004
WO WO-20110005869 A2 1/2011

OTHER PUBLICATIONS

International Preliminary Report for Application No. PCT/EP2016/059199 dated Dec. 12, 2017.
(Continued)

*Primary Examiner* — Christopher J Brown
(74) *Attorney, Agent, or Firm* — Harness, Dickey & Pierce, P.L.C.

(57) ABSTRACT

A method for generating an electronic signature of a user for an electronic document including establishing a secure Internet session between a telecommunication terminal of a user and a signature server computer system; receiving a code from the signature server computer system via a separate and/or separately secured side channel by the telecommunication terminal; transmitting a combination of code and authentication information of the user via the secure Internet session to the signature server computer system; checking the validity of the combination of code and authentication information by the signature server computer system; and generating the electronic signature of the user by a high-security module of the signature server computer system, wherein the private key of the user for generating the electronic signature is stored in the high-security module.

17 Claims, 5 Drawing Sheets

Figure 1:
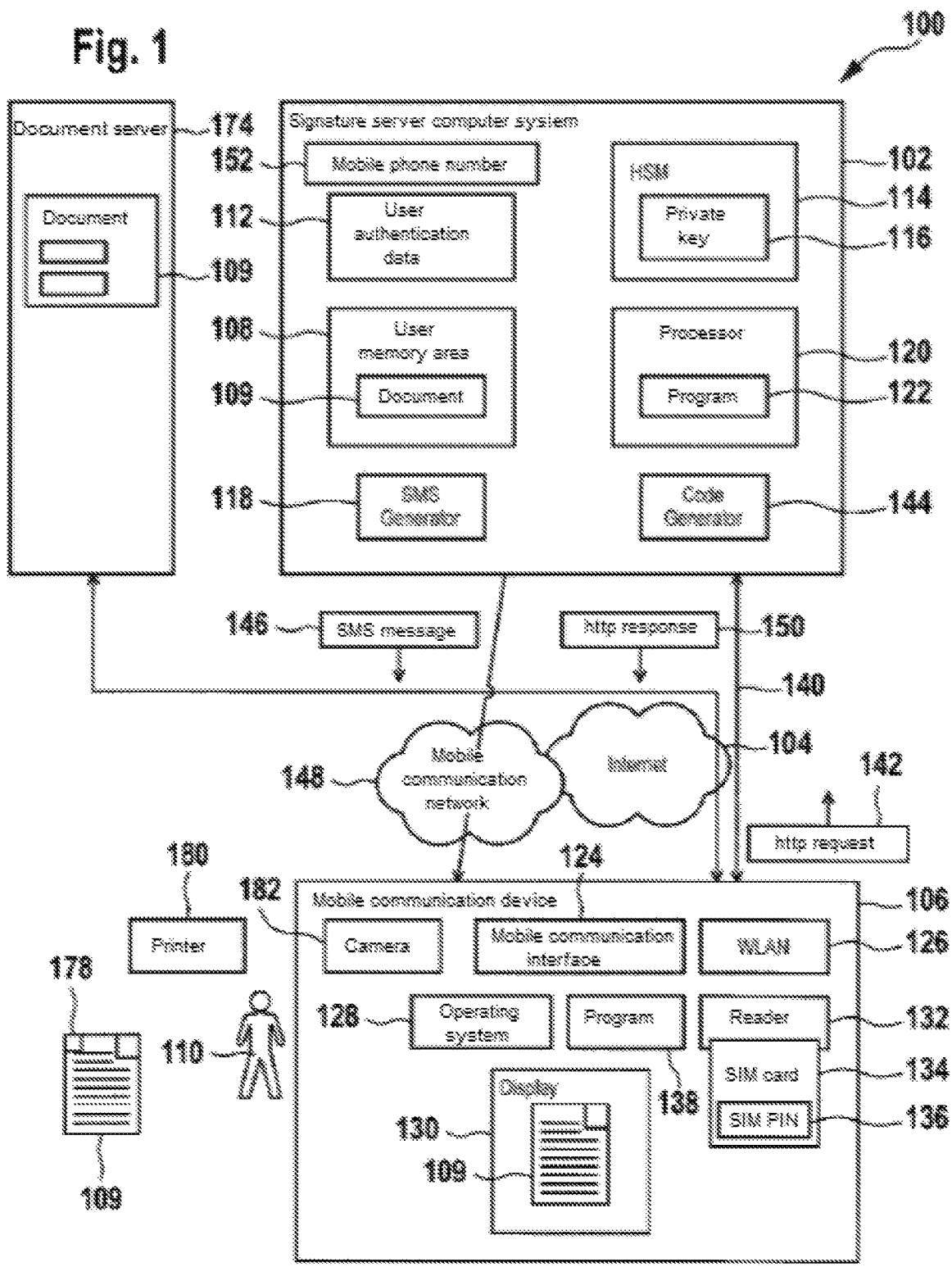

(51) Int. Cl.
    G06F 21/64   (2013.01)
    G06F 21/43   (2013.01)
    H04L 9/08    (2006.01)
    H04L 29/06   (2006.01)
    H04W 12/06   (2009.01)

(52) U.S. Cl.
    CPC .......... H04L 9/0897 (2013.01); H04L 9/3215 (2013.01); H04L 9/3231 (2013.01); H04L 9/3234 (2013.01); H04L 63/168 (2013.01); H04W 12/06 (2013.01)

(58) Field of Classification Search
    USPC .......................................................... 713/176
    See application file for complete search history.

(56) References Cited

U.S. PATENT DOCUMENTS

| | | | | |
|---|---|---|---|---|
| 9,565,175 | B1* | 2/2017 | Saylor | G06F 21/10 |
| 2013/0246610 | A1* | 9/2013 | Hirano | G06Q 10/101 |
| | | | | 709/224 |
| 2015/0235203 | A1* | 8/2015 | Polak | G06F 21/645 |
| | | | | 705/44 |

OTHER PUBLICATIONS

Advanced Security Mechanisms for Machine Readable Travel Documents and eIDAS Token—, Feb. 3, 2015 (Feb. 3, 2015), XP055239778, Retrieved from the Internet <URL:https://www.bsi.bund.de/SharedDocs/Downloads/EN/BSI/Publications/TechGuidelines/TR03110/BSI_TR-03110_Part-2-V2_2.pdf?_blob=publicationFile&v=1> [retrieved on Jan. 8, 2016].

Cornelinux: "One-time password—Wikipedia, the free encyclopedia", Mar. 11, 2015 (Mar. 11, 2015), XP055283231, Retrieved from the Internet <URL:https://en.wikipedia.org/w/index.php?title=One-time_password&oldid=650876586> [retrieved on Jun. 23, 2016].

International Search Report PCT/ISA/210 for International Application No. PCT/EP22016/059199 dated Apr. 25, 2016.

Office Action for corresponding European Application No. 16 718 361.5 dated Oct. 4, 2019.

Calypso 10: "Transaktionsnummer—Wikipedia," Apr. 18, 2015, XP055282254, https://de.wikipedia.org/w/index.php?title=Transaktionsnummer&oldid=140970550.

* cited by examiner

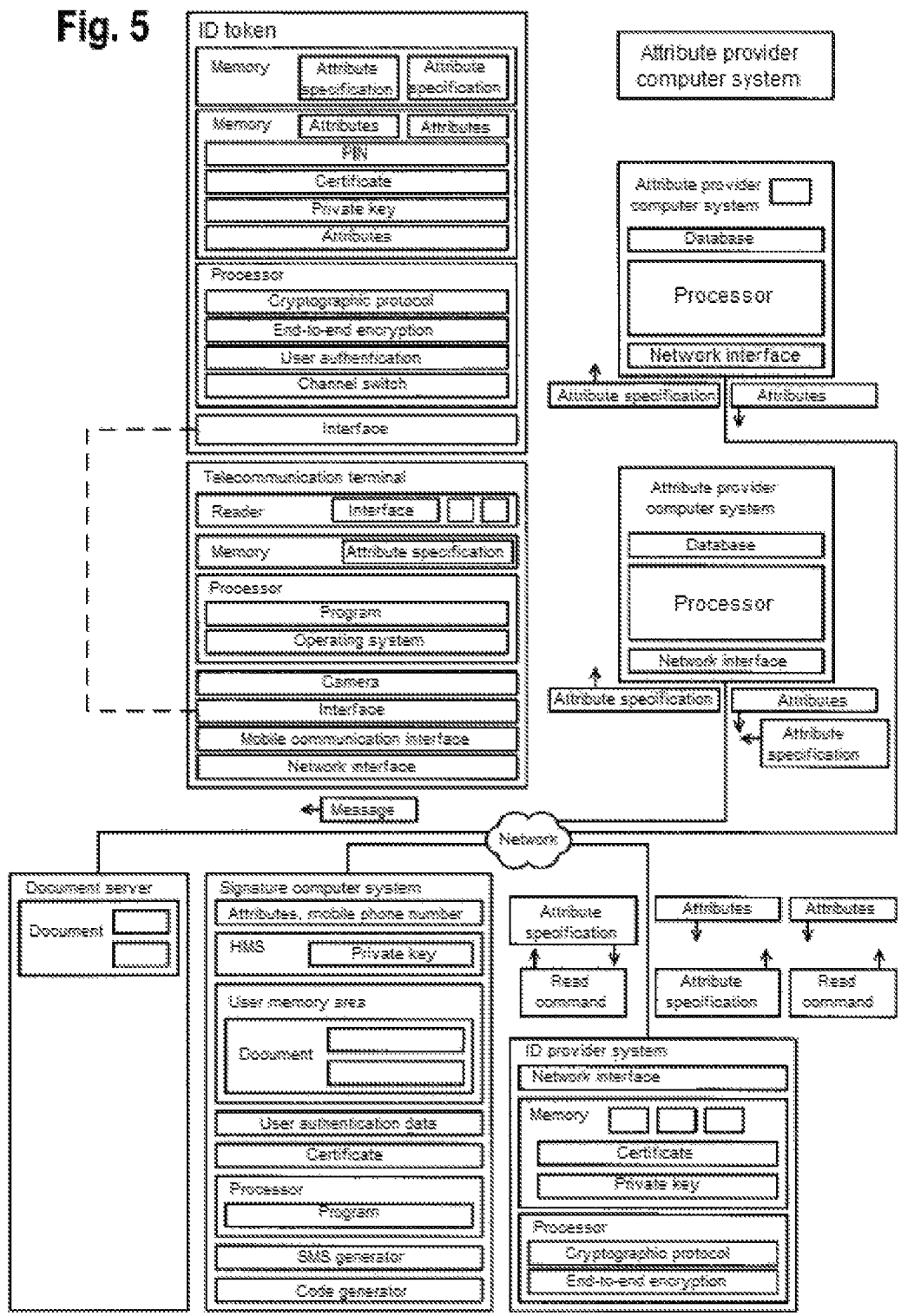

METHOD FOR GENERATING AN ELECTRONIC SIGNATURE

CROSS-REFERENCE TO RELATED APPLICATIONS

This application is a national phase under 35 U.S.C. § 371 of PCT International Application No. PCT/EP2016/059199 which has an International filing date of Apr. 25, 2016 which claims priority to German Application No. 102015208088.9, filed Apr. 30, 2015, the entire contents of each are hereby incorporated by reference.

The invention relates to a method for generating an electronic signature of a user with the aid of a telecommunication terminal, i.e. what is known as a mobile signature, and to a corresponding telecommunication terminal, a signature server computer system, and a telecommunication system.

A signature method is known from DE 197 476 03 A1 in which the message to be signed is transmitted from a PC to a message server. The message to be signed is transmitted from the message server to a mobile phone assigned to the PC and is then signed in the mobile phone. The resultant signature is transmitted back from the mobile phone to the message server.

DE 602 12 577 T2 presents a method for certifying data transmitted via a network, in particular an unsecure network.

By contrast, the object of the present invention is to create an improved method for generating an electronic signature with the aid of a telecommunication terminal, and also a corresponding telecommunication terminal, a signature server computer system, and a telecommunication system.

The objects underlying the invention are solved by the features of the respective independent claims. Embodiments of the invention are specified in the dependent claims.

Embodiments of the invention are particularly advantageous since on the one hand the implementation effort is particularly low, because the electronic signature is not generated by the telecommunication terminal itself, and instead the generation of the signature is merely initiated with the aid of the telecommunication terminal, without the need for any particular hardware prerequisites or a key management of cryptographic keys on the part of the telecommunication terminal, and on the other hand the method is particular secure, and in particular can be legally compliant.

The generation of an electronic signature specifically presupposes, in accordance with embodiments of the invention, a 2-factor authentication of the user, specifically the confirmation of the "possession", specifically the possession of the telecommunication terminal, and the "knowledge", specifically the knowledge of the authentication information.

The confirmation of the possession of the telecommunication terminal is provided by transmitting a code from the signature server computer system via a side channel to the telecommunication terminal. This code can be received by the user only if the user is in possession of the telecommunication terminal. The subsequent transmission of the combination of the code and of the authentication information of the user via the secure Internet session can thus also take place only if the user is both in possession of the telecommunication terminal and knows his authentication information, whereby 2-factor authentication is provided.

An "electronic signature" is understood here to mean a single electronic signature, an advanced electronic signature, or a qualified electronic signature, wherein the latter is based on a qualified certificate valid at the time of generation thereof and has to be created with a secure signature creation unit in order to meet the highest requirements of security.

A "high-security module" (HSM), which is also referred to as a hardware security module, is understood here to mean a peripheral, in particular a (internal or external) peripheral, for storing a cryptographic key and executing cryptographic operations. An HSM makes it possible to assure the trustworthiness and integrity of data and the information associated therewith, in particular in IT systems. In order to guarantee the trustworthiness, the cryptographic keys being used should be protected both at software level and also against physical attacks or side-channel attacks.

An HSM ensures that the private key(s) stored therein is/are inaccessible. The protection of the private key can go so far that, in the event of an attempt to read the private key, the HSM destroys itself or at least resets, in such a way that the private key is irretrievably deleted.

An "electronic document" is understood here to mean in particular a file which can be visualised on a visualisation apparatus, i.e, what is known as a display, or which can be printed out on a printer. The file, for example, can be a text file, or a Word, Excel, or PDF document, or another electronic document, which for example contains a form with input fields. In order to open a document of this kind, for example in order to display, fill out or print out the document, a program is usually necessary in order to perform what is known as the rendering of the file. This program can be the full version of the program in question or what is known as a viewer.

A "telecommunication terminal" is understood here to mean a portable, battery-operated device with a mobile communication interface, in particular a mobile phone, a smartphone, or a portable computer, such as a laptop, notebook or tablet PC with a mobile communication interface. The telecommunication terminal, besides the mobile communication interface, can also have one or more further communication interfaces for wireless communication, for example a Bluetooth and/or a WLAN interface.

A "mobile communication network" is understood here in particular to mean a digital cellular telecommunication network which operates in accordance with a mobile communication standard, such as a GSM, UMTS, CDMA or an LTE standard. A mobile communication network of this kind can be used to establish a connection to the Internet.

An "Internet session" is understood here to mean a temporary communication connection via the Internet, i.e. what is known as a communication session. In accordance with the OSI layer model, an Internet session can relate to the transport layer or the application layer. In particular, an Internet session can be an http session or an https session, wherein in the case of the latter the transport layer is protected by symmetric encryption.

A "signature server computer system" is understood here to mean a computer system which has a communication interface for establishing an Internet session and which is connected to a high-security module.

A "side channel" is understood here to mean a communication channel via which communication takes place separately from the Internet session. It can be a separately secured channel embedded in the Internet session. However, it is also possible that the side channel is a message channel for the signalling component of the communication in a mobile communication network, via which channel signalling information for controlling voice connections, rooming information, billing information, information for determining the device type, short message service (SMS) messages and/or voice messages is transmitted, for example.

An "ID token" is understood here in particular to mean a portable electronic device which is assigned to a user and which has at least one data memory for storing at least one attribute value and a communication interface for reading the attribute. The ID token preferably has a secure memory area for storing the at least one attribute value in order to prevent the attribute value stored in the memory area from being changed inadmissibly or being read without the authorisation necessary for this purpose.

In particular, the ID token can be a USB stick or a document, in particular a document of value or security document. A "document" is understood in accordance with the invention to mean paper-based and/or plastic-based documents, for example electronic identification documents, in particular passports, personal identity cards, visas and driving licences, vehicle registration documents, vehicle titles, company ID cards, health cards or other ID documents, and also chip cards, payment means, in particular banknotes, bank cards and credit cards, consignment notes, or other credentials, in which a data memory for storing the at least one attribute is integrated.

The ID token can be a hardware token or a soft token, if cryptographically tied to a hardware token, i.e. for example to what is known as a secure element.

In particular, a soft token of this kind tied cryptographically to a secure element can be generated in accordance with DE 10 2011 082 101, of which the disclosure is hereby incorporated across its full scope in the disclosure of the present patent application.

In accordance with one embodiment of the invention the secure Internet session, for example an https session, is firstly established between the telecommunication terminal of the user and the signature server computer system. The user then inputs into his telecommunication terminal a signature request for the signing of the electronic document, which signature request is transmitted from the telecommunication terminal via the secure Internet session, for example as an http request.

The signature server computer system, on the basis of the receipt of the signature request, then generates a code, for example by generating a random value or a pseudorandom value. By way of example, the signature server computer system for this purpose can have a hardware-implemented binary symmetric source (BSS), which delivers random values of maximum entropy. Alternatively, the signature server computer system can have a software-implemented random generator, which delivers pseudorandom values.

In accordance with one embodiment of the invention the Internet session is secured at the application layer or the transport layer by means of symmetric or asymmetric encryption.

In accordance with one embodiment of the invention the code is not transmitted from the signature server computer system to the telecommunication terminal via the secure Internet session, but instead via a separate channel, specifically via a side channel of the mobile communication network, for example in the form of an SMS message. It is thus ensured that the telecommunication terminal from which the Internet session to the signature server computer system has been established and from which the signature request has been received is the same telecommunication terminal to which the signature server computer system sends the code. This is because receipt of the code is possible only if the user is actually in possession of the telecommunication terminal.

In accordance with one embodiment of the invention the user must firstly authenticate himself to his telecommunication terminal, before the secure Internet session can be established. This is implemented for example by inputting a personal identification number, i.e. what is known as a PIN, which the user inputs via the keypad of his telecommunication terminal. The telecommunication terminal compares the input PIN with a reference value of the PIN, which for example is stored on the SIM card located in the card reader of the telecommunication terminal. In the event that the input PIN matches the reference PIN stored on the SIM card, the user is authenticated and the telecommunication terminal is unblocked, so that the user can utilise the functions thereof. It is thus ensured that, for 2-factor authentication, not only is the possession of the telecommunication terminal confirmed, but also the possession of the authorised user to whom the telecommunication terminal is assigned and who is the only one to known the PIN for unblocking his telecommunication terminal.

In order to further increase the security, it can be provided that the user must firstly log into the signature server computer system, more specifically via the secure Internet session, before the electronic signature for the user can be generated. The user can log in for example by inputting a username/password combination for the user.

In accordance with one embodiment of the invention the electronic document to be signed is stored in a memory area of the signature server computer system accessible only to the logged-in user, i.e. what is known as a virtual document safe of the user. In order to sign a document stored in the document safe of the user, the user selects this document for example by clicking on it, so that the selected electronic document is firstly transmitted via the secure Internet session to the telecommunication terminal and is displayed there. The user can then take note of the electronic document and supplement it as necessary, for example by inputting attribute values of the user, for example the name, address and date of birth of the user, depending on which input fields are provided in the electronic document. If the user wishes to release this electronic document for signing, he inputs the signature request into the telecommunication terminal, and said signature request is transmitted via the secure Internet session to the signature server computer system, so that this then generates the electronic signature for the document with the aid of the HSM and the private key of the user stored in the HSM.

In accordance with one embodiment of the invention the electronic document has a unique identifier, for example a unique URL, by means of which the electronic document can be retrieved. The identifier can be contained in the electronic document for example in the form of an optically detectable code, for example a barcode or a QR code. The electronic document can be provided to the user in the form of a visualisation, for example on the display of his PC, or in the form of a printout.

The user can capture the identifier of the document for example with the aid of the camera of his telecommunication terminal, for example by photographing the QR code, which contains the identifier, and decoding the QR code by means of a suitable app of the telecommunication terminal.

The user can then transmit a message, which contains this identifier, to the signature server computer system in order to request the storage of the electronic document in the document safe set up for the user on the signature server computer system, i.e. in the memory area of the signature server computer system accessible only to the user. This message can be transmitted for example in the form of an SMS message, which has the further advantage that the user, by means of this message, is uniquely identified and authenticated to the signature server computer system, since the sending of the SMS message presupposes the possession of the telecommunication terminal.

The signature server computer system accesses the corresponding electronic document with the aid of the identifier contained in the message and stores said document in the document safe of the user. Once the electronic document has been stored in the document safe in this way, said document can be digitally signed as described above.

In accordance with one embodiment of the invention the initial registration of the user is performed with the aid of an ID token of the user, for example with the aid of an electronic identification document of the user, for example his electronic personal identity card. The ID token of the user has a protected memory area, in which attribute values of attributes of the user are stored, for example the first name, surname, address, and/or date of birth of the user. These attribute values of the user should be stored as part of the user profile by the signature server computer system, for which purpose a secure and trustworthy readout and transmission of these attribute values to the signature server computer system is necessary.

To this end, the user must first authenticate himself to the ID token. This can be implemented by inputting authentication data of the user into the telecommunication terminal via a local connection established between the telecommunication terminal and the ID token, for example via an RFID or NFC connection, or by capturing the authentication data of the user directly by means of the ID token, which for example for this purpose can have a biometric sensor for biometric authentication.

The signature server computer system also authenticates itself to the ID token via the Internet, for example with the aid of a certificate and/or an authorisation certificate. Once both the user and the signature server computer system have successfully authenticated themselves to the ID token, a connection with end-to-end encryption is established between the signature server computer system and the ID token and runs via the Internet and the telecommunication terminal, that is to say the local connection established between the telecommunication terminal and the ID token.

The attribute values of the user are then transmitted from the ID token to the signature server computer system via this connection with end-to-end encryption and are stored there for creation of the user profile of the user.

For the reading of the attribute values of attributes of the user from the ID token, the signature server computer system thus assumes the role of an ID provider computer system, as is known per se from the prior art. For example, a method for reading attributes from an ID token is known from DE 10 2008 000 067 B4, in which an ID provider computer system reads at least one attribute value from the ID token via a network, wherein the ID token for example can be an identification document. Developments of this method are known from DE 10 2008 040 416 A1, DE 10 2009 001 959 A1, DE 10 2009 027 676, DE 10 2009 027 681 A1, DE 10 2009 027 682 A1, DE 10 2009 027 686 A1, DE 10 2009 027 723 A1, DE 10 2009 046 205 A1 and DE 10 2010 028 133 A1.

The authentication of the user to the ID token can comprise the following steps, for example:
 capturing a biometric feature of the user by an interface,
 comparing the captured biometric feature with a biometric feature stored on the ID token by the ID token, and
 authenticating the user if the captured biometric feature matches the stored biometric feature.

Alternatively, the initial registration of the user can be performed with the aid of what is known as a video identification method.

In this method biometric features and attribute values of the user are detected from an ID token by the telecommunication terminal in a first step and are transmitted via an end-to-end encryption to the signature computer system.

The biometric features of the user corresponding to the stored biometric features are then captured by the telecommunication terminal and are transmitted via an end-to-end encryption to the signature computer system.

The stored biometric features are compared on the signature computer system with the captured biometric features of the user. If the features match, the user is identified.

Further attribute values of the user can lastly be detected and stored in a user profile.

For example, the ID token can be an identification document, on which a photograph of the user is stored, or other biometric features, such as fingerprints. These features can be captured for example using a camera of the telecommunication terminal. The corresponding biometric features of the user are then captured by the camera, for example by means of the user standing with his face in front of the camera.

The comparison of the features can be performed in an automated manner depending on the type of features. Alternatively, a manual comparison can be performed by a member of staff.

The attribute values can be read jointly with the biometric features or can be transmitted, for example read from an ID token, only following successful identification.

In accordance with one embodiment of the invention the electronic document to be signed has input fields, into which attribute values of the user are to be entered, for example the first name, surname, address and date of birth of the user. The signature server computer system then accesses the attribute values stored for the user at the time of his initial registration so as to automatically fill out the corresponding input fields of the electronic document. This can be performed at the time at which the electronic document is stored in the document safe of the user, or once the user has selected the electronic document in his document safe, for example by clicking on the document.

In accordance with one embodiment of the invention the input fields of the electronic document and the attributes are semantically associated with one another. This can be implemented so that the input fields have the same names as the attributes, in other words the input field for inputting the first name of the user is titled "first name", that is to say has the same name as the attribute "first name", On account of this semantic association between input field and attribute, the signature server computer system can automatically enter the attribute value of the attribute "first name" into the input field having the same name.

Missing attributes can then be added by the user, for example by being input manually.

In order to enter further attributes into the document which are not stored in the user profile of the user and which are not initially provided in the ID token, the method claimed in German patent application 10 2015 200 313.2, which was unpublished at the time of the present application and of which the disclosure is hereby incorporated across its full scope in the disclosure of the present patent application, can be used.

In particular, missing details can be added by the following steps:

sending a first attribute specification from the signature computer system to an ID provider computer system via the communication network, wherein the first attribute specification specifies those attributes required by the signature computer system in order to fill out the input fields of the document, authenticating the user to the ID token, authenticating the ID provider computer system to the ID token, authenticating the ID token to the ID provider computer system, establishing a first secure transmission channel with end-to-end encryption between the ID token and the ID provider computer system via the network, performing a first read access of the ID provider computer system to the ID token in order to read the attributes according to the first attribute specification from the ID token, transmitting a first set of the attributes specified in the first attribute specification and stored in the memory area of the ID token from the ID token to the ID provider computer system via the first secure transmission channel, generating a second attribute specification of a second set of the attributes of the first attribute specification specifying those attributes not contained in the first set, and transmitting the second attribute specification from the ID provider computer system to the ID token via the first secure transmission channel, storing the second attribute specification in the ID token, authenticating an attribute provider computer system to the ID token, authenticating the ID token to the attribute provider computer system, establishing a second secure transmission channel with end-to-end encryption between the attribute provider computer system and the ID token, wherein the first secure transmission channel remains unchanged, transmitting the second attribute specification from the ID token via the second secure transmission channel to the attribute provider computer system, performing a write access of the attribute provider computer system via the second secure transmission channel in order to store attributes according to the second attribute specification in the ID token, performing a second read access of the ID provider computer system via the first secure transmission channel in order to read the attributes stored by the attribute provider computer system in accordance with the second attribute specification in the ID token, outputting the attributes read from the ID token on the basis of the read access by the ID provider computer system to the signature computer system, entering the attributes into the input fields of the document.

In a further aspect the invention relates to a corresponding telecommunication terminal.

In a further aspect the invention relates to a corresponding signature server computer system.

In a further aspect the invention relates to a telecommunication system with a signature server computer system and at least one telecommunication terminal according to the invention. The ID token of the user can also belong to the telecommunication system.

Figure 2:
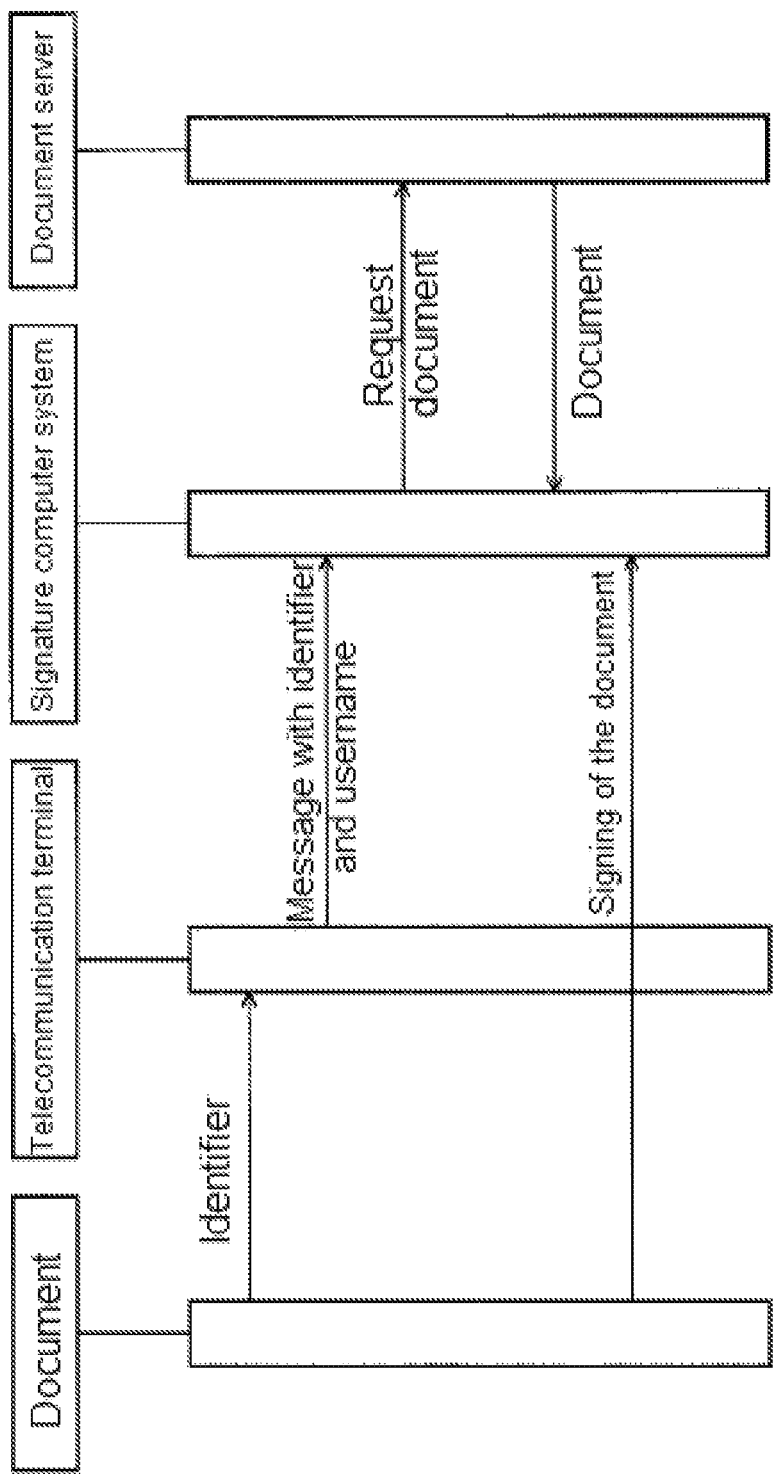
Figure 3:
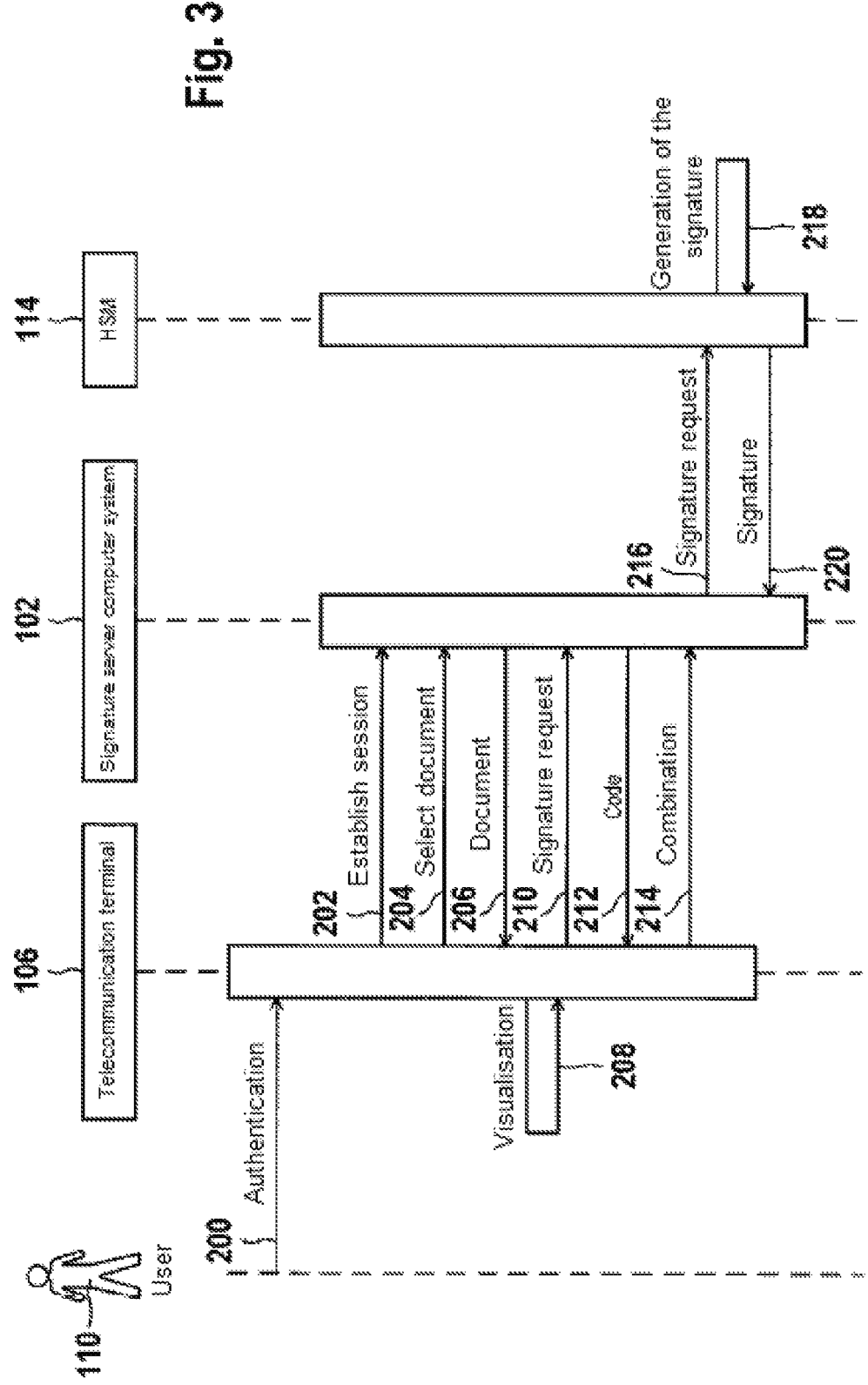
Figure 4:
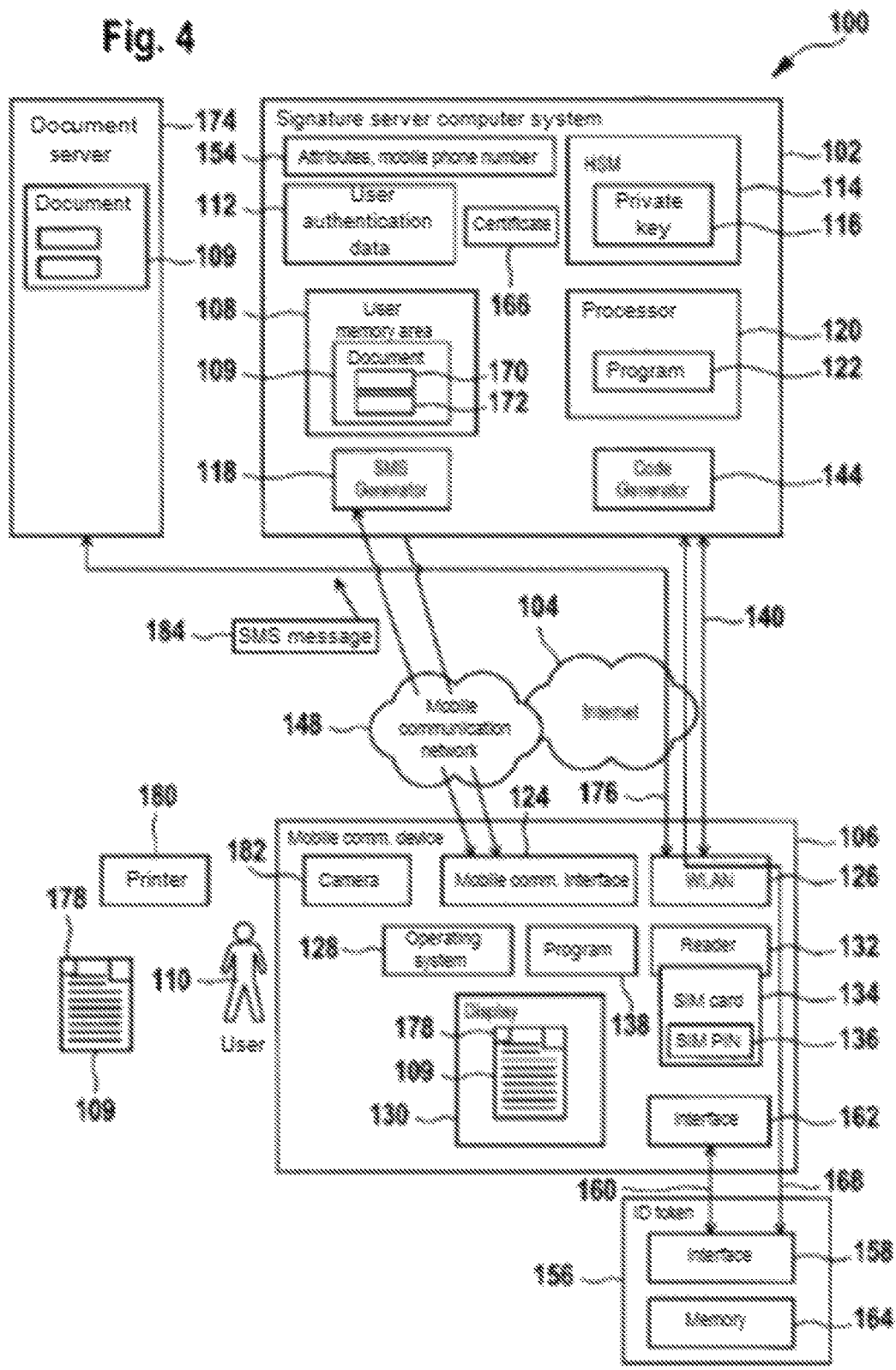

Embodiments of the invention will be explained in greater detail hereinafter with reference to the drawings, in which:

FIG. 1 shows a block diagram of an embodiment of a telecommunication system according to the invention, FIG. 2 shows a UML diagram for illustrating an embodiment of a method according to the invention, FIG. 3 shows a UML diagram for illustrating the generation of a signature in accordance with an embodiment of the method according to the invention, FIG. 4 shows a block diagram of a further embodiment of a telecommunication system according to the invention, and FIG. 5 shows a block diagram of a further embodiment of a telecommunication system according to the invention.

Elements in the following embodiments which correspond to one another or are the same are denoted hereinafter by identical reference signs.

FIG. 1 shows a telecommunication system 100 with a signature server computer system 102, which can communicate via a network 104, in particular the Internet, with a telecommunication terminal 106.

The signature server computer system 102 has a user memory area 108, in which at least one electronic document 109 is stored. The user memory area 108 is a protected memory area, which is accessible only to the user 110, i.e. is what is known as a virtual document safe.

The signature server computer system 102 stores user authentication data 112 of the user 110, for example a username/password combination of the user 111, which the user requires to log in to the signature server computer system 102. The signature server computer system 102 also has an HSM 114, in which a private key 116 of the user 110 and, as applicable, further registered users is stored.

The signature server computer system 102 has an SMS generator 118 for generating and sending SMS messages, and at least one processor 120 for running a computer program 122 which serves to execute and control the steps of the method sequence concerning the signature server computer system.

The signature server computer system 102 also has a code generator 144 for generating a code, which for example can be a random value or a pseudorandom value. In particular, the code generator 144 can be formed as a binary symmetric source for generating codes of maximum entropy.

The telecommunication terminal 106 has at least one mobile communication interface 124, which can be designed both for communication via the side channel of the mobile communication network, in particular for receiving SMS messages, and for connection to the Internet. The telecommunication terminal 106 can have one or more further wireless communication interfaces, for example a WLAN interface 126, via which an Internet session can likewise be established.

The telecommunication terminal 106 has an operating system 128, for example an iOS, Android or Windows operating system, a visualisation device, i.e. a display 130, in particular for visualizing the document 109, and a reader 132 for insertion of an SIM card 134, on which reader reference data are stored for the authentication of the user to the telecommunication terminal 106 with the SIM card 134 disposed therein, for example specifically what is known as the SIM PIN 136 of the user 110.

The telecommunication terminal 106 also has a program 138 for executing the steps of the method involving the telecommunication terminal 106. The program 138 can be formed as a conventional Internet browser program, for example Microsoft Internet Explorer, Safari, Google, Chrome, or Firefox. Alternatively, the program 138 can be a special application program, i.e. what is known as an app.

The following procedure is performed in order to generate an electronic signature of the user 110 for the electronic document 109:

1. A secure Internet session 140 is established between the telecommunication terminal 106 and the signature server computer system 102.

If the program 138 is an Internet browser, this step is implemented for example so that the user 110 starts the program 138 and inputs a URL of the signature server computer system 102. For example, the Internet session 140 is then established via the WLAN interface 126 of the telecommunication terminal 106, via which Internet session the user 110 must then authenticate himself to the signature server computer system 102, for example by inputting his username/password combination, which is compared by the signature server computer system with the user authentication data 112 stored there in order to log in the user. The logging-in of the user 110 identifies and authenticates the user to the signature server computer system 102, and the user 110 is granted access via the Internet session 140 to the user memory area 108 assigned to said user. One or more documents, in particular the document 109, can already be stored in this user memory area 108. Alternatively, the user 110 can upload the document 109 to the signature server computer system 102 via the Internet session 140, so that the document is stored there in the user memory area 108.

2. The user 110 can then request the generation of an electronic signature for the document 109 from the signature server computer system 102. Here, an approach can be adopted such that the user 110 firstly selects the document 109 via the Internet session 140, for example by means of a corresponding input on the display 130, which can be designed as a touch-sensitive display, whereupon the document 109 is transmitted from the user memory area 108 via the Internet session 140 to the telecommunication terminal 106 and is visualised on the display 130, so that the user 110 can take note of the content of the document 109. The user 110 can now input a signature request into his telecommunication terminal 106 for the signing of the document 109, which request is transmitted for example as an http request 142 to the signature server computer system via the Internet session 140. The signature server computer system 102 then generates a code for this signature request of the user with the aid of the code generator 144.

The signature server computer system 102 then sends this code via a side channel of the communication network 148, for example in the form of an SMS message 146, to the telecommunication terminal 106. For example, the signature server computer system 102 to this end accesses the mobile phone number 152 of the user 110, which is stored as part of the registration data of the user 110 in the signature server computer system 102, in order to send the SMS message 146 to the telecommunication terminal 106.

3. The signature server computer system 102 also responds to the http request 142 with a response, that is to say an http response 150, which contains an input request for the input of a combination of the code sent previously with the SMS message 146 and authentication information of the user for the release of the signature function. The authentication information for release of the signature function can be what is known as the signature PIN of the user. The user then inputs the code received previously with the SMS message 146 and his signature PIN into the telecommunication terminal 106 in order to respond to the http response 150. The code and the authentication information are then transmitted via the Internet session 140 from the telecommunication terminal 106 to the signature server computer system 102.

4. By means of the program 122, it is checked whether the code received via the Internet session 140 matches the code sent previously with the SMS message 146 and whether the signature PIN of the user is correct. If both the code and the authentication information are valid, the HSM 140 is actuated by the program 122 in order to generate a signature of the user 110 for the document 109 with the aid of the private key 116 of the user 110. The resultant signed document 109 can then be stored for example by the signature server computer system 102 in the user memory area 108, so that the user 110 can access said signed document for the further use thereof, for example forwarding of the signed document 109 by the user 110 to a third party via the network 104. The signed document can also be forwarded to a third party in an automated manner by the signature server computer system 102.

FIG. 2 shows a UML diagram of an embodiment of a corresponding method.

In the step 200 the user 110 firstly authenticates himself to his telecommunication terminal 106 by inputting his SIM PIN into the telecommunication terminal 106, with said PIN then being forwarded from the telecommunication terminal 106 via the reader 132 to the SIM card 134, which checks whether the input SIM PIN matches the SIM PIN 136 stored in the SIM card. Following successful authentication, the user 110 can then use the various functions of the telecommunication terminal 106.

In the step 202 the Internet session 140 is established, for example by starting the program 138, which can be formed as an Internet browser or as a special app. The user then 110 authenticates himself to the signature server computer system, for example by inputting his username/password combination, so that he logs in to the signature server computer system 102.

In the step 204 the user 110 selects one of the documents stored in his user memory area 108, for example the document 109. The selected document is then transmitted in step 206 from the signature server computer system 102 to the telecommunication terminal 106 via the Internet session 140 and is visualised there in step 208. If the user 110 now wishes to sign the visualised document 109, he inputs a corresponding request into the telecommunication terminal 106, which request is transmitted in step 210 to the signature server computer system 102 via the Internet session 140.

The signature server computer system 102 then generates a code, for example a random value or pseudorandom value, which in step 212 is sent to the telecommunication terminal 106 via a side channel of the communication network 148, for example a signalling channel of a mobile communication network, for example in the form of an SMS message 146.

In step 214, the user 110 inputs the code and his signature PIN into the program 138, so that this combination of code and signature PIN is transmitted in step 214 to the signature server computer system 102 via the Internet session 140. The signature server computer system 102 then checks the validity of the combination of the received code and the signature PIN, that is to say it checks whether the code received via the Internet session 140 matches the code 146 sent previously with the SMS message and whether the signature PIN of the user 110 is correct.

In the case of validity of the code and of the signature PIN, a signature request of the signature server computer system 110 is provided in step 206 at the HSM 114 in order to request the generation of a signature for the document 109. The HSM 114 then generates this signature in step 218 with the aid of the private key 116 of the user 110 and delivers the signature of the document 109 to the signature server computer system 102 in step 220.

The signature server computer system 102 then stores the signed document 109 for example in the user memory area 108 for further use by the user 110 and/or it forwards the signed document 109 to a third party, for example a declaration recipient or contractual partner of the user 110.

FIG. 3 shows a block diagram of a further embodiment of a telecommunication system 100 according to the invention. In the embodiment considered here, the signature server computer system stores registration data 154 of the user 110, which data, besides the mobile phone number 152, also include attributes with the associated attribute values of the user 110. The initial registration of the user 110 is performed here with the aid of an ID token 156 of the user 110, for example an electronic identification document of the user 110, in particular an electronic personal identity card in the Federal Republic of Germany.

The ID token 156 has an interface 158 for establishing a local connection 160 to a corresponding interface 162 of the telecommunication terminal 106. The interfaces 158 and 162 can be formed for example as RFID or NSC interfaces.

The ID token 156 also has an electronic memory 164, in which the attribute values of attributes of the user 110, for example the name and address of the user 110, are stored. The following approach is adopted for the initial registration of the user 110 by the signature server computer system 102:

1. The user brings the ID token 156 into the region of the interface 162, so that the local connection 160 can be established. The user authenticates himself to the ID token 156 by inputting corresponding authentication data, for example into the telecommunication terminal 106 or directly into the ID token 156, if this for example has a keypad or a biometric sensor. The signature server computer system 102 also authenticates itself to the ID token 156, for example in that the signature server computer system 102 transmits a certificate 166, which in particular can be formed as what is known as an authentication certificate, to the ID token 156 via the Internet session 140, the telecommunication terminal 106, and the local connection 160. This certificate serves to confirm the authenticity of the signature server computer system 102 and to confirm the authorization thereof to read the attribute values of the user 110 stored in the memory 164.
2. Once these two authentications have been successfully performed, a connection 168 with end-to-end encryption is established between the signature server computer system 102 and the ID token 156, more specifically via the Internet session 140, the telecommunication terminal 106, and the local connection 160. This is performed at an application layer.
3. The signature server computer system 102 then sends a read command, which for example can be formed as a chip card command, for example what is known as an APDU, for the reading of attribute values from the memory 164 via the connection 168 to the ID token 156, which then sends the requested attribute values to the signature server computer system 102 via the connection 168. The signature server computer system 102 stores the read attribute values as part of the registration data 150 for the user 110.

The document 109, in the embodiment considered here, has input fields 170 and 172 for inputting the name and the address of the user 110. For example, the document 109 is an electronic form for submitting a declaration, for example to an insurance company or authority.

The signature server computer system 102 can now automatically fill out the input fields 170 and 172 by accessing the registration data 154 of the user 110. This can be triggered by the storing of the document 109 in the user memory area 108 or for example if the user 110 selects the document (see step 204 in the embodiment according to FIG. 2), so that the user 110 is presented on the display 140 with the document already filled out. The user 110 can then add further details as necessary to the display document (see step 208), wherein these changes are transmitted to the server computer system 102 via the Internet session 140 and are likewise made in the document 109 stored there. The user can then request the signature of this document filled out in this way (see step 210). This saves the user 110 having to repeatedly input his original data into electronic forms.

The association of the input fields 170 and 172 of the document 109 with corresponding attributes of the user 110, as are stored in the ID token 156 and are also provided on the signature server computer system 102 as part of the registration data 154, can be implemented by a semantic link, that is to say the attributes have the same name in the ID token 156 and in the registration data 154 as the corresponding input fields 170 and 172 of the document 109. It is hereby made possible that the server computer system 102 automatically enters the corresponding attribute values of the user 100 into the input fields 170 and/or 172, more specifically independently of the specific structure or file format of the document 109, and without this having to be programmed in particular for each individual document.

The document 109 can firstly be presented to the user 110 as a printout. For example, the document 109 is sent to the user 110 by an insurance company or an authority, wherein the user 110 must submit a declaration. The document 109 can be sent to the user 110 by post, or the user connects his telecommunication terminal 106 via the network 104, for example the Internet, to a document server 174 on which the document 109 is provided for download. This can occur via an Internet session 176, which does not necessarily have to be secure, that is to say for example an http session. The user 110 can then upload the document 109 via the Internet session 140 into the user area 108 of the signature server computer system 102 in order to then request the generation of the signature (see step 210).

FIG. 5 shows a telecommunication system 100 which enables a supplementation of the attribute values.

The ID token 156 has an electronic memory 164 with protected memory areas 186, 188 and 190. The protected memory area 186 serves to store a reference value, which is required for the authentication of the user 110 to the ID token 156. This reference value is for example an identifier, in particular what is known as a personal identification number (PIN), or reference data for a biometric feature of the user 102 which can be used for the authentication of the user to the ID token 106.

The protected area 188 serves to store a private key, and the protected memory area 190 serves to store attributes, for example of the user 110, for example the name, place of residence, date of birth or sex of the user and/or attributes relating to the ID token itself, for example the institution that produced or issued the ID token, the period of validity of the ID token, an identifier of the ID token, for example a passport number or a credit card number.

The electronic memory 164 can also have a memory area 192 for storing a certificate. The certificate contains a public key, which is associated with the private key stored in the protected memory area 188. The certificate may have been created in accordance with a public key infrastructure (PKI) standard, for example in accordance with the X.509 standard.

The certificate does not necessarily have to be stored in the electronic memory 164 of the ID token 156. Alternatively or additionally, the certificate can also be stored in a public directory server.

The ID token 106 has a processor 194. The processor 194 serves to execute program instructions 196, 198 and 200. The program instructions 196 serve for user authentication, i.e. for authentication of the user 110 to the ID token.

In one embodiment with PIN, the user 110 inputs his PIN for his authentication, for example into the telecommunication terminal 106. By execution of the program instructions 196, access is then granted to the protected memory area 188 so as to compare the input PIN with the reference value of the PIN stored there. Should the input PIN match the reference value of the PIN, the user 110 is deemed to be authenticated.

Alternatively, a biometric feature of the user 110 is captured. For example, the ID token 156 for this purpose has a fingerprint sensor, or a fingerprint sensor is connected to the telecommunication terminal 106. The biometric data captured from the user 110 are compared in this embodiment, by execution of the program instructions 196, with the biometric reference data stored in the protected memory area 188. If there is a sufficient match between the biometric data captured from the user 110 and the biometric reference data, the user 110 is deemed to be authenticated.

The program instructions 200 serve to execute the steps of a cryptographic protocol involving the ID token 156 for authentication of an ID provider computer system 202 to the ID token 156. The cryptographic protocol can be a challenge-response protocol based on a symmetric key or an asymmetric key pair.

For example, an extended access control method is implemented by the cryptographic protocol, as is specified for machine-readable travel documents (MRTDs) by the International Civil Aviation Authority (ICAO). By successful execution of the cryptographic protocol, the ID provider computer system 202 authenticates itself to the ID token and thus confirms its authority to read the attributes stored in the protected memory area 192. The authentication can also be reciprocal, i.e. the ID token 156 must also authenticate itself to the ID provider computer system 202 in accordance with the same protocol or another cryptographic protocol.

The program instructions 198 serve for end-to-end encryption of data transmitted between the ID token 156 and the ID provider computer system 202, but at least the attributes read by the ID provider computer system 202 from the protected memory area 190. For the end-to-end encryption, a symmetric key can be used which for example is agreed between the ID token 156 and the ID provider computer system 202 at the time of execution of the cryptographic protocol.

Alternatively to the embodiment illustrated in FIG. 5, the telecommunication terminal 106 cannot communicate directly with the interface 158 by means of its interface 162, but instead via a reader for the ID token 106 connected to the interface 162. The PIN can also be input via this reader, for example what is known as a class 2 chip card terminal.

The ID provider computer system 202 has a network interface 204 for communication via the network 104. The ID provider computer system 202 also has a memory 206, in which a private key 208 of the ID provider computer system 202 and the corresponding certificate 210 are stored. This certificate as well can be, for example, a certificate according to a PKI standard, for example X.509.

The ID provider computer system 202 also has at least one processor 212 for executing program instructions 214 and 216. By executing the program instructions 215, the steps of the cryptographic protocol involving the ID provider computer system 202 are executed. On the whole, the cryptographic protocol is thus implemented by execution of the program instructions 200 by the processor 194 of the ID token 106 and by execution of the program instructions 146 by the processor 212 of the ID provider computer system 202.

The program instructions 148 serve to implement the end-to-end encryption on the part of the ID provider computer system 202, for example on the basis of the symmetric key which was agreed between the ID token 106 and the ID provider computer system 202 at the time of execution of the cryptographic protocol. In principle, any method previously known per se for agreeing the symmetric key can be used for the end-to-end encryption, for example a Diffie Hellman key exchange.

The ID provider computer system 202 is preferably located in a particularly protected environment, in particular in what is known as a trust centre, so that the ID provider computer system 202, in combination with the need to authenticate the user 102 to the ID token 106, forms the trust anchor for the authenticity of the attributes read from the ID token 106.

The signature server computer system 102, as described in FIG. 4, can automatically fill out the input fields 170 and 172 of the document 109 by accessing the registration data 154 of the user 110.

The association of the input fields 170 and 172 of document 109 with corresponding attributes of the user 110, as are stored in the ID token 156 and are also provided on the signature server computer system 102 as part of the registration data 154, can be implemented by a semantic link, that is to say the attributes have the same name in the ID token 156 and in the registration data 154 as the corresponding input fields 170 and 172 of the document 109. It is hereby made possible that the server computer system 102 automatically enters the corresponding attribute values of the user 100 into the input fields 170 and/or 172, more specifically independently of the specific structure or file format of the document 109, and without this having to be programmed in particular for each individual document.

The signature computer system 102 has a network interface for connection to the network 104. The signature computer system 102 also has at least one processor 120 for executing program instructions 122. By executing the program instructions 122, dynamic HTML pages for example are generated, via which the user 102 can input his request or his order.

Depending on the type of document 109, however, further attributes may be necessary, which are not stored in the user profile of the user 110 and/or which are not initially provided in the ID token. To this end, the telecommunication system 100 shown in FIG. 1 can have one or more attribute provider computer systems 214, 216, 218, etc. These can be structured in principle identically to the ID provider computer system and have additional functionalities for reading or generating attributes and for writing attributes and, as necessary, attribute specifications into the ID token.

The following approach is adopted for entering further attributes into the document 109 which are not stored in the user profile of the user 110 and are not initially provided in the ID token:

a) The signature computer system 102 sends a first attribute specification 220, which specifies the attributes required for filling out the document. This first attribute specification for example specifies a number of M attributes A1, A2, A3, . . . AM.

b) For example, the attribute specification 220 is temporarily stored in a memory 222 of the telecommunication terminal 106. On account of the receipt of the attribute specification 220 by the telecommunication terminal 106, the user 110 is requested to authenticate himself to the ID token 156. To this end, the user 110 inputs his PIN for example via the reader 132 or a keypad of the telecommunication terminal 106. The telecommunication terminal 106 also establishes a further Internet session to the ID provider computer system 202 via the network 104, via which the ID provider computer system 202 authenticates itself to the telecommunication terminal 110, more specifically with use of the certificate 210.

A reciprocal authentication of the ID token 156 and of the ID provider computer system 202 or of the corresponding attribute provider computer system is preferably performed with use of the certificates 192 and 210, i.e. what are known as a CA and a TA. Here, a session key is also agreed, with which the first secure transmission channel with end-to-end encryption between the ID token 156 and the ID provider computer system is established via the telecommunication terminal 106 and the network 104. The telecommunication terminal 106 also forwards the attribute specification 220 to the ID provider computer system 202 via the existing session with the ID provider computer system 202.

c) The ID provider computer system 202 responds to the first attribute specification 220 with a read command 222 to read the attributes specified in the first attribute specification. This read command 222 is transmitted from the ID provider computer system 202 to the ID token 156 via the first secure transmission channel with end-to-end encryption. The processor 194 then accesses the electronic memory 164 in order to read the attributes according to the first attribute specification 220. Hereinafter, without loss of generality, it is assumed that, of the M attributes according to the first attribute specification 220, only P attributes A1, A2, A3, . . . , AP are provided, wherein P<M. The ID token 156 responds to the read command 222 with the response 224, which contains the first set of the attributes specified in the first attribute specification 220, specifically the attributes A1 A2, A3, . . . , AP. The response 224 is transmitted from the ID token 156 to the ID provider computer system 202 via the first secure transmission channel.

d) The ID provider computer system 202 stores the response 224 with the first set of attributes in its memory 206 and generates a second attribute specification 226, which specifies the attributes still missing, that is to say the specified attributes of the first attribute specification 220 not contained in the response 224, that is to say in this case the attributes AP+1 to AM. The second attribute specification 226 is transmitted via the first secure transmission channel from the ID provider computer system 202 to the ID token 156 and is stored there and can replace an existing attribute specification in the event of storage in the non-volatile or volatile memory. The attribute specification can be stored for example in a volatile memory 228 of the ID token 156.

e) The telecommunication terminal 106 establishes a further Internet session via the network 104 with the attribute provider computer system 214. The attribute provider computer system 214 then authenticates itself to the ID token 156, wherein a reciprocal authentication, i.e. a CA and a TA, are preferably performed. Here, a second secure transmission channel with end-to-end encryption is established with a session key between the ID token 156 and the attribute provider computer system 214 via the network 104 and the telecommunication terminal 106, wherein the first secure transmission channel remains unchanged.

The processor 194 serves to execute program instructions 230 for channel switchover, that is to say the selection of one of the secure transmission channels, that is to say here the first or the second secure transmission channel, for the external communication. On account of the establishment of the second secure transmission channel, the second secure transmission channel is selected by the processor 194 by execution of program instructions 230, via which channel the ID token 156 then sends the second attribute specification 226 to the attribute provider computer system 214.

f) The attribute provider computer system 214 then accesses its database 232 in order to read the attributes according to the second attribute specification 226. The attribute provider computer system 214 then responds to the attribute specification 226 with its response 234, which contains the attributes read from the database 232, and sends this response 234 via the second secure transmission channel to the ID token 156, which stores the response 234 with these attributes using its electronic memory 164.

g) By executing the program instructions 230, the ID token 156 then switches back to the first secure transmission channel. The ID provider computer system 202 then accesses the ID token 156 by a second read command 236 via the first secure transmission channel and, in response thereto, receives from the ID token 156 the response 234 from the memory 164 with the attributes still missing.

In the event that the attribute provider computer system 214 cannot access all attributes necessary according to the second attribute specification 226, for example because these are not all stored in the database 232, the above-mentioned process can be performed iteratively with use of the further attribute provider computer systems 216, 218, etc., more specifically until all the attributes according to the first attribute specification 220 are present in the memory 164 or another termination condition is met.

Should the attribute provider computer system 214 be unable to determine all the attributes according to the second attribute specification 226, the attribute provider computer system 214 generates a third attribute specification 238. If, for example, the response 234 contains the attributes AP+1 to AQ with Q<M, the attributes still missing AQ+1 to AM are specified in the third attribute specification 238. This third attribute specification 238 is transmitted from the attribute provider computer system 214 to the ID token 156 via the second secure transmission channel and replaces or updates the second attribute specification 226 stored in the memory 228.

Following the prior CA and TA, a third secure transmission channel is then established to the attribute provider computer system 218, which reads the third attribute specification 178 from the ID token 156 and responds thereto with a response 240, which contains the attributes still missing according to the third attribute specification 238. This response 240 is transmitted from the attribute provider computer system 218 to the ID token 156 via the third secure transmission channel and is stored in the memory 164.

By executing the program instructions 230, a switch is made again back to the first secure transmission channel, so that on account of the second read command 236 in this case both the response 234 and the response 240, which overall contain the attributes AP+1 to AM, are transmitted to the ID provider computer system 202.

If not all of the attributes according to the third attribute specification 238 are available from the attribute provider computer system 216, the method can be repeated analogously by incorporating one or more further attribute provider computer systems, for example the attribute provider computer system 218, in the process.

The ID provider computer system 202, following successful execution of the above-mentioned method steps, has in its memory 206 all of the attributes requested with the first attribute specification 220. The ID provider computer system 202 then generates a message 242 which contains these attributes A1 to AM, signs this message, and sends it via the network 104 to the signature computer system 102, wherein this can be performed via the telecommunication terminal 106.

The signature computer system 102 can then fill out the document 109 as appropriate with the aid of the attributes contained in the message 242.

As described in FIG. 3, a signature for the document 109 can then be generated.

The attribute provider computer systems 214, 216, 218, etc. can be constructed similarly to the ID provider computer system 202, that is to say they each have a network interface, a processor for executing program instructions, and a memory, in which a certificate and a private key are stored. The certificate is preferably an authorization certificate, in which an authorization for read and write access to the ID token 156 is specified.

In accordance with a further embodiment the document 109 has a unique identifier, for example a URL, with the aid of which the document 109 can be downloaded from the document server 174. This URL can be printed in the form of an optically readable code 178, for example as a barcode or QR code, for example on the front page of the document 109. The user 110, who has received the document 109 by post or who has printed out the document 109 using his printer 180, can now capture the optically readable code 178 with the aid of the camera 182 of his telecommunication terminal 106, in order to detect the URL for access to the document 109. The URL detected in this way is sent from the telecommunication terminal 106, for example in the form of an SMS message 184, to the signature server computer system 102.

The signature server computer system 102 identifies the user 110 as sender of the SMS message 184 on the basis of the registered mobile phone number 152 thereof. The signature server computer system 102 then uses the identifier of the document 109 contained in the SMS message 184, that is to say for example the URL, in order to access the document 109 via the network 104, and to load the document 109 into the user memory area 108, so that it is then signed following a corresponding signature request (see step 210).

The initial registration of the user 110 can alternatively be performed by means of a video identification method. The following approach is adopted in a method of this kind:

1. The telecommunication terminal 106 reads at least one biometric feature of the user 110 stored on the ID token 156 via an interface. For example, the interface can be the camera 182 of the telecommunication terminal 106, and the stored biometric feature can be the passport photo of an identification document. Alternatively, other stored biometric features, such as fingerprints, can also be read. An additional interface might be necessary for this purpose, or the user must move the identification document in front of the camera 182.
2. The stored biometric feature is then transmitted from the telecommunication terminal 182 to the signature computer system 102 with end-to-end encryption.
3. For comparison with the stored biometric feature, a biometric feature of the user 110 corresponding to the stored biometric feature is captured by the interface of the telecommunication terminal 106. If the stored biometric feature of the user is a passport photo, the user 110 for example can hold their face in front of the camera 182.
4. The captured biometric feature is then transmitted from the telecommunication terminal 106 to the signature computer system 102 using end-to-end encryption.
5. The transmitted stored biometric feature and the transmitted captured biometric feature are compared on the signature computer system 102, and the user 110 is identified if the stored biometric feature and the captured biometric feature match. The comparison can be performed automatically, for example by a suitable program. Alternatively, however, the comparison can also be performed manually by a member of staff.
6. Following successful identification of the user 106, a user profile 154 of the user is stored on the signature computer system, wherein the user profile contains attribute values of the user 106. The attribute values can be read from the ID token jointly with the stored biometric feature or can be queried and/or read from the ID token 156 following successful identification of the user 110.

The initial registration of the user 110 can be performed alternatively using an established method, such as post identification or other identification methods.

| List of reference signs | |
|---|---|
| 100 | telecommunication system |
| 102 | signature server computer system |
| 104 | network |
| 106 | telecommunication terminal |
| 108 | user memory area |
| 109 | electronic document |
| 110 | user |
| 112 | user authentication data |
| 114 | HSM |
| 116 | private key |
| 118 | SMS generator |
| 120 | processor |
| 122 | computer program |
| 124 | mobile communication interface |
| 126 | WLAN interface |
| 128 | operating system |

-continued

| List of reference signs | |
|---|---|
| 130 | display |
| 132 | reader |
| 134 | SIM card |
| 136 | SIM PIN |
| 138 | program |
| 140 | Internet session |
| 142 | http request |
| 144 | code generator |
| 146 | SMS message |
| 148 | mobile communication network |
| 150 | http response |
| 152 | mobile phone number |
| 154 | registration data |
| 156 | ID |
| 158 | interface |
| 160 | local connection |
| 162 | interface |
| 164 | memory |
| 166 | certificate |
| 168 | connection |
| 170 | input field |
| 172 | input field |
| 174 | document server |
| 176 | Internet session |
| 178 | optically readable code |
| 180 | printer |
| 182 | camera |
| 184 | SMS message |

The invention claimed is:

1. A method for generating an electronic signature of a user for an electronic document, a telecommunication terminal of a telecommunication network being assigned to the user, said method comprising the following steps:
established a secure Internet session between the telecommunication terminal of the user and a signature server computer system,
receiving a code from the signature server computer system via a separate and/or separately secured side channel by the telecommunication terminal,
transmitting a combination of code and authentication information of the user via the secure Internet session to the signature server computer system,
checking the validity of the combination of code and authentication information by the signature server computer system, and
generating the electronic signature of the user by a high-security module of the signature server computer system, wherein the private key of the user for generating the electronic signature is stored in the high-security module, wherein the method further comprises the following steps for an initial registration of the user by the signature server computer system:
authenticating the user to an ID token assigned to the user, wherein the ID token has a protected memory area, in which attribute values of attributes of the user are stored,
authenticating the signature server computer system to the ID token via the Internet,
establishing a connection with end-to-end encryption between the signature server computer system and the ID token via the Internet and the telecommunication terminal,
transmitting the attribute values of the user from the ID token to the signature server computer system via the connection with end-to-end encryption, and
storing a user profile of the user, which profile contains the attribute values of the user received from the ID token, in order to carry out the registration of the user by the signature server computer system.

2. The method according to claim 1, wherein the code is a random value or a pseudorandom value which is generated by the signature server computer system on the basis of the receipt of a signature request for the generation of the electronic signature via the secure Internet session.

3. The method according to claim 1, wherein the secure Internet session is an https session.

4. The method according to claim 1 wherein the code is received by the telecommunication terminal via the side channel of the mobile communication network as an SMS message or as a generated automatic voice message.

5. The method according to claim 1 wherein the user is authenticated to the telecommunication terminal, for example by the user logging in to the signature server computer system via the secure Internet session, so that the identity of the user is recognised by the signature server computer system.

6. The method according to claim 5, wherein the electronic document to be signed is stored in a memory area of the signature server computer system accessible to the logged-in user, wherein the user selects the document via the secure Internet session, so that the document is transmitted to the telecommunication terminal and visualised there via the secure Internet session, whereupon the user sends the signature request for the generation of the electronic signature for the selected electronic document to the signature server computer system via the secure Internet session.

7. The method according to claim 6, wherein the electronic document has an identifier, the identifier is captured by the user with the aid of the telecommunication terminal, the telecommunication terminal sends a message, which includes the identifier, and the signature server computer system identifies the user on the basis of the message, accesses the electronic document with the aid of the identifier, and stores said document in the memory area of the user.

8. The method according to claim 7, wherein the telecommunication terminal generates an SMS message and sends it to the signature server computer system via the mobile communication network, wherein the SMS message contains the identifier of the document.

9. The method according to claim 1, wherein the authentication of the user to the ID token comprises the following steps:
capturing a biometric feature of the user by an interface,
comparing the captured biometric feature with a biometric feature stored on the ID token by the ID token, and
authenticating the user if the captured biometric feature matches the stored biometric feature.

10. The method according to claim 1 comprising the following further steps for the initial registration of the user by the signature server computer system:
reading at least one biometric feature of the user stored in the ID token from the ID token by the telecommunication terminal,
detecting the attribute values of the user,
transmitting the stored biometric feature from the telecommunication terminal to the signature computer system with end-to-end encryption,
capturing at least one biometric feature of the user corresponding to the stored biometric feature by an interface of the telecommunication terminal,
transmitting the captured biometric feature from the telecommunication terminal to the signature computer system with end-to-end encryption, and comparing the stored biometric feature and the captured biometric feature on the signature computer system and identifying the user if the stored biometric feature and the captured biometric feature match.

11. The method according to claim 10, wherein the biometric feature is read by means of an interface of the telecommunication terminal, in particular by means of a camera, and the corresponding biometric feature of the user is captured using the same interface.

12. The method according to claim 1 wherein the electronic document contains at least one input field, wherein the signature server computer system accesses the user profile in order to enter one of the attribute values into the at least one input field.

13. The method according to claim 12, wherein the input field and the attribute of which the attribute value is entered into the input field are semantically associated with one another.

14. The method according to claim 12 comprising the following steps:
sending a first attribute specification-from the signature computer system to an ID provider computer system via the communication network, wherein the first attribute specification specifies the attributes required by the signature computer system in order to fill out the input fields of the document,
authenticating the user to the ID token,
authenticating the ID provider computer system to the ID token,
authenticating the ID token to the ID provider computer system,
establishing a first secure transmission channel with end-to-end encryption between the ID token and the ID provider computer system via the network,
performing a first read access of the ID provider computer system to the ID token in order to read the attributes according to the first attribute specification from the ID token,
transmitting a first set of the attributes specified in the first attribute specification and stored in the memory area of the ID token from the ID token to the ID provider computer system via the first secure transmission channel,
generating a second attribute specification of a second set of the attributes of the first attribute specification, which specifies those attributes which are not contained in the first set, and transmitting the second attribute specification from the ID provider computer system to the ID token via the first secure transmission channel,
storing the second attribute specification in the ID token,
authenticating an attribute provider computer system to the ID token,
authenticating the ID token to the attribute provider computer system,
establishing a second secure transmission channel with end-to-end encryption between the attribute provider computer system and the ID token, wherein the first secure transmission channel remains unchanged,
transmitting the second attribute specification from the ID token to the attribute provider computer system via the second secure transmission channel,
performing a write access of the attribute provider computer via the second secure transmission channel in order to store attributes according to the second attribute specification in the ID token,
performing a second read access of the ID provider computer system via the first secure transmission channel in order to read the attributes stored by the attribute provider computer system in accordance with the second attribute specification in the ID token,
outputting the attributes read from the ID token on the basis of the read access by the ID provider computer system to the signature computer system, and
inputting the attributes into the input fields of the document.

15. A telecommunication terminal for requesting the generation of an electronic signature of a user for an electronic document from a signature server computer wherein the telecommunication terminal is assigned to the user, said telecommunication terminal configured to:
establish a secure Internet session between the telecommunication terminal and the signature server computer system,
receive the electronic document to be signed via the secure Internet session from the signature server computer system, and/or visualize the electronic document on a visualisation device of the telecommunication terminal,
transmit a request of the user via the secure Internet session for the generation of the electronic signature by the signature server computer system for the electronic document visualised on the visualisation device,
receive a code from the signature server computer system via a separate and/or separately secured side channel of the communication network, and
transmit a combination of the code and authentication information of the user to the signature server computer system via the secure Internet session, wherein the telecommunication terminal comprises a communication interface for establishing a local connection to an ID token of the user, and wherein said telecommunication terminal is further configured to:
authenticate the user to the ID token, and
enable attributes of the user stored in the ID token to be read via the local connection by the signature server computer system with end-to-end encryption between the ID token and the signature server computer system.

16. A signature server computer system for generating an electronic signature of a user for an electronic document, said system configured to:
establish a secure Internet session between a telecommunication terminal of the user and the signature server computer system, wherein the telecommunication terminal comprises a communication interface for establishing a local connection to an ID token of the user,
generate and send a code from the signature server computer system to the telecommunication terminal via a side channel of the mobile communication network,
receive a combination of the code and authentication information of the user via the secure Internet session,
check the validity of the combination of the code and of the authentication information by the signature server computer system, wherein
said signature server computer system comprises a high-security module configured to store the private key of the user for generating the electronic signature of the user, and wherein said system is further configured to:
authenticate itself to the ID token via the Internet session, the telecommunication terminal and the local connection, establish a connection, with end-to-end encryption, with the ID token via the Internet session, the telecommunication terminal and the local connection, send a read command to the ID token via the connection with end-to-end encryption for reading attribute values from the ID token, receive the attribute values via the connection with end-to-end encryption, and store the attribute values as part of registration data for the user.

17. The signature server computer system according to claim 16, wherein the system is further configured to generate a random value or a pseudorandom value for generation of the code, and generate an SMS message in order to send the code via the side channel of the communication network to the telecommunication terminal of the user.

\* \* \* \* \*